July 7, 1959   N. E. SPIESS, JR., ET AL   2,893,609
CHEESE CURD METERING APPARATUS
Filed Sept. 26, 1955   2 Sheets-Sheet 1
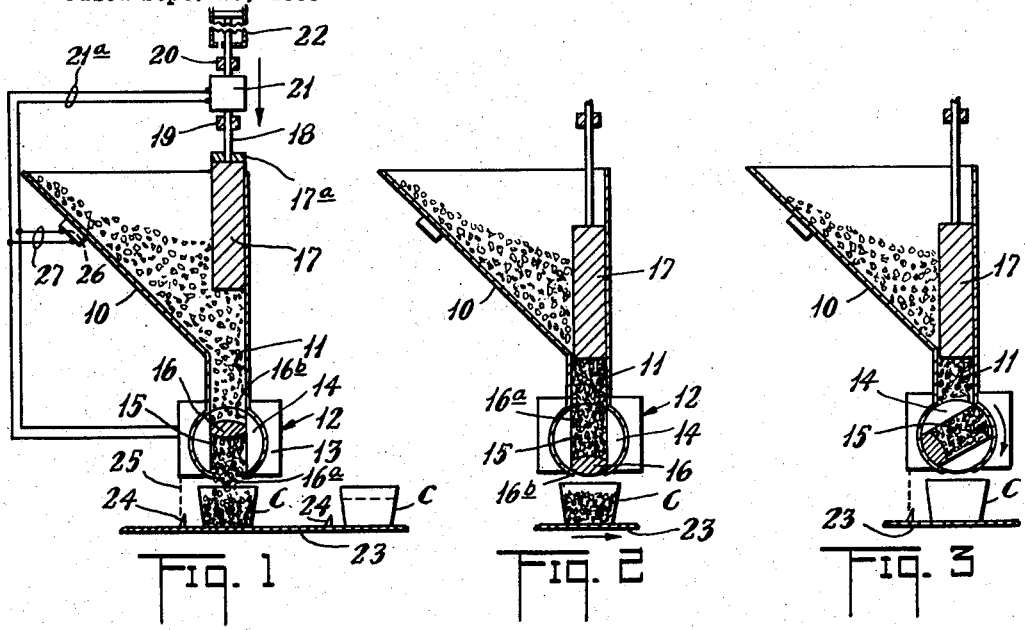
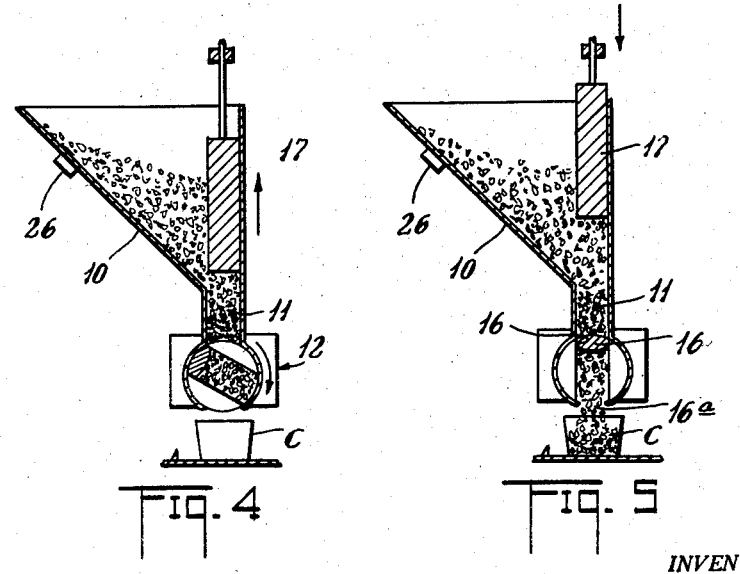
INVENTOR.
NEWTON E. SPIESS, JR.
MARTIN J. ZENK, JR.
BY
ATTORNEYS

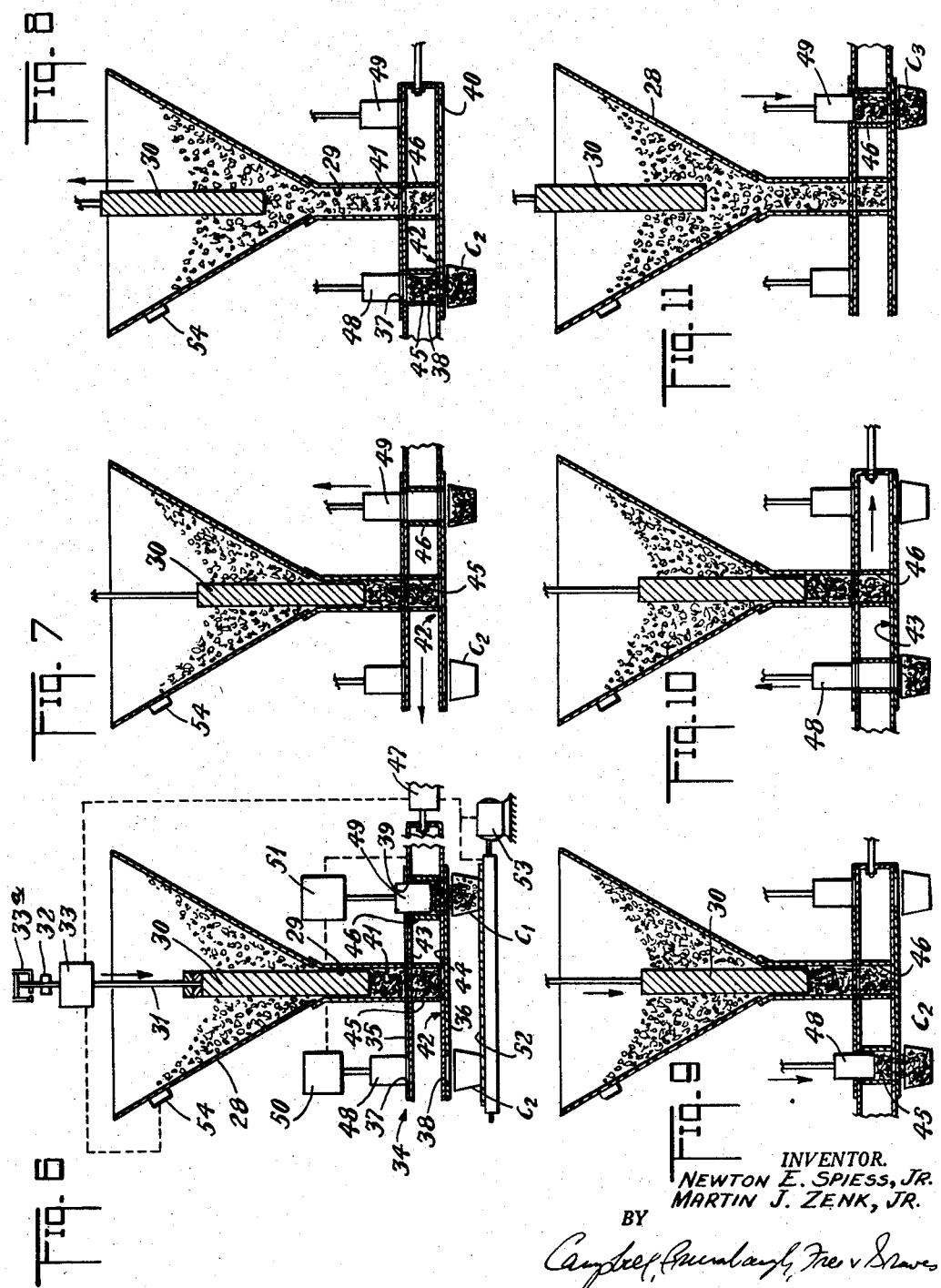

United States Patent Office 2,893,609
Patented July 7, 1959

2,893,609

CHEESE CURD METERING APPARATUS

Newton E. Spiess, Jr., Oakdale, and Martin J. Zenk, Jr., West Islip, N.Y., assignors, by mesne assignments, to National Dairy Products Corporation, New York, N.Y., a corporation of Delaware Application September 26, 1955, Serial No. 536,400

8 Claims. (Cl. 222—219)

This invention relates to metering apparatus and more particularly to apparatus for metering and dispensing predetermined quantities of a pressure sensitive product such as cottage cheese.

The packaging of cottage cheese for delivery to consumers, whether in the dry curd form or creamed, has posed a problem in the dairy industry. In packaging the dry curd the irregularly shaped and relatively large particle sizes coupled with their characteristic tacky nature tend to create void spaces randomly throughout the mass, making it difficult to achieve uniform weight to volume ratios in the metering operation. Time consuming and costly hand filling is often used, particularly in those cases in which the much preferred large curd particle size is required. It is also costly in addition to being difficult to dispense cottage cheese, whether in dry curd form or creamed, automatically by weight because such automatic devices depend upon sensitive knife edges and numerous electrical controls. In dairy plants where frequent hosing down of equipment with hot water is required, equipment of this nature has not proven to be adequately durable.

Other types of filling machines employ a fixed volume principle in an attempt to obtain a given weight. Such machines have not been readily adaptable to the metering of cottage cheese, particularly the dry curd, because of the presence of randomly disposed voids throughout the curd mass. Furthermore, the infeed to the measuring component of such apparatus is not in general sufficiently positive to achieve accurate results and attempts to rectify this problem have resulted in an undesirable breaking down of the curd particle size.

It is an object of the present invention, therefore, to provide apparatus for metering and dispensing small precisely controlled amounts of cottage cheese.

Another object of the invention is to provide a durable and economical apparatus for metering cottage cheese, particularly in large particle, dry curd form, in uniform weights without breaking down the discrete curd particles.

Representative embodiments of the invention are described below having reference to the accompanying drawings in which:

Figure 1 is a diagrammatic view in vertical section of a metering apparatus;

Figures 2–5, inclusive, show sequentially the several stages of operation of a portion of the metering apparatus of Figure 1;

Figure 6 is a diagrammatic view in vertical section of a modified metering apparatus; and Figures 7–11, inclusive, show sequentially the several stages of operation of metering apparatus of Figure 6.

Referring to Figure 1, there is shown a metering apparatus including a hopper 10 formed at its lower end with a feed cylinder 11 above a measuring and valving member indicated generally by the numeral 12. The measuring and valving member 12 includes a housing 13 in which is mounted a cylindrical rotor 14 formed transversely of its axis with a cylindrical throughway 15 in which is mounted a freely movable or floating piston 16 capable of travelling to opposite ends of the throughway to engage suitable stops 16a and 16b respectively. The rotor 14 is driven by a suitable motor (not shown) to present opposite ends of the throughway 15 sequentially to the mouth of the feed cylinder 11.

Mounted in the hopper 10 directly above the feed cylinder 11 is a piston 17 to the upper end of which is attached a carrier and guide rod 18 slidably received in suitable guide bushings 19 and 20. Piston lifting means 21 is provided adjacent the rod 18 to raise the piston in the hopper in response to control signals received through a conduit 21a for example. The piston raising means 21 is so arranged that it raises the piston to a predetermined height in the hopper whereupon it is lowered to engage the cheese mass to apply its weight thereto. To avoid inertia effects which would result were the piston to be dropped in a free fall through a distance before engaging the cheese, thereby erratically compressing the cheese, motion damping means 22 such as a dash pot, cam-actuating lowering device or the like can be used. Once in engagement with the mass, the piston feels the resistance thereof and there is little or no need for further damping. At the low velocity of normal fall through or on the cheese curd, the damping means 22 need impose little or no resistance and the piston becomes in effect a freely falling piston. The downward pressure exerted by the freely falling piston 17 is controlled by the weight of the piston 17 and the rod 18 supplemented as desired by the addition of weights 17a.

Disposed below the measuring and valving member 12 is a conveyer 23 which moves from left to right under the control of an intermittently actuated motive means (not shown) as viewed in Figure 1 and which is adapted to carry containers C into which the contents of the hopper are dispensed in measured quantities. The containers C can be placed on the conveyer 23 in a predetermined spaced relationship either manually or by suitable automatic means so that successive containers are brought beneath measuring and valving member 12 to be filled. The motion of the conveyer, the action of the measuring and valving member 12 and the action of the piston 17 can all be coordinated by suitable means such for example as actuators 24 movable with the conveyer and switch actuating means 25 to be engaged thereby. The switch actuating means 25 are preferably connected to initiate, in sequence one half rotation of the rotor 14, and through the conduit 21a, the lifting and release for free fall of the piston 17. In addition, if desired, suitable means such as a vibrator 26 can be provided in the hopper to insure the contents of the hopper fall beneath the working end of the piston 17, the vibrator 26 being connected to the conduit 21a by a conduit 27.

In operation, assuming the hopper 10 to be filled with a supply of dry cheese curd of large particle size and the piston 17 to have been raised to its uppermost position, the operation is commenced by the release of the piston 17 to fall by gravity toward the feed cylinder 11. This compresses the curd in the feed cylinder to a predetermined degree sufficient to eliminate void spaces therein but at the same time insufficient to damage the discrete curd particles. The falling piston urges the curd through the feed cylinder 11 into the upper end of the throughway 15, which constitutes the measuring space, driving the movable piston 16 to the lower extreme of its travel. This expels the charge of packed curd disposed beneath the piston 16 from the lower end of the throughway 15 into the container C below. Air venting, as by providing a loose fit for the piston 17 in the cylinder 11, is desirable to prevent pneumatic blocking of the travel of the piston.

Figures 2–5 show the successive positions of the operative components of the metering apparatus throughout a complete cycle of operation. Referring to Figure 2, the weighted or freely falling piston 17 is shown in its lowermost position as is the floating piston 16 in the metering and valving means 12. While the piston 17 is exerting its predetermined pressure on the column of compressed cheese curd in the feed cylinder 11 and the throughway 15, the rotor 14 is turned through 180° shearing the curd column at the junction of the feed cylinder 11 and the throughway 15 to present the filled throughway to the next empty container C which has been brought into position by the moving conveyer 23. Meantime, referring to Figure 4, the piston raising means 21 has been actuated to lift the piston 17 to its upper position while the vibrator means 26 insures the fall of a supply of curd down the hopper to fill the void beneath the piston. The piston 17 is then released for free fall to compress a new column of curd toward the feed cylinder 11 and to force the floating piston 16 downwardly to expel the measured charge of cheese curd in the waiting empty conveyer.

Referring to Figure 6, there is shown a modified form of metering and dispensing apparatus. In this arrangement the downwardly converging walls of a hopper 28 terminate in a feed cylinder 29 into which a weighted piston 30 normally disposed in the hopper 28 is adapted to fall. The weighted piston 30 has connected to its upper end a guiding and lifting rod 31 movable in suitable guide means 32 under the influence of piston raising means 33 and damping means 33a. Disposed at the lower extremity or mouth of the feed cylinder 29 is a slide assembly indicated generally by the numeral 34 and including a pair of vertically spaced parallel stationary plates 35 and 36 formed respectively with aligned openings 37—38 and 39—40. A single opening 41 is formed in the center of the upper plate 35 in register with the mouth of the feed cylinder 29. Slidably mounted between the plates 35 and 36 is a slide 42 having upper and lower slide plates 43 and 44 bridged by a pair of cylindrical measuring members 45 and 46, the two ends of each of which open through the respective plates 43 and 44. The slide 42 is moved back and forth by actuating means indicated diagrammatically at 47 and which can take the form for example of a conventional crank.

Disposed above the openings 37 and 39 in the upper plate 35 are, respectively, loading pistons 48 and 49 adapted to be driven up and down by suitable actuating means 50 and 51, respectively. Disposed beneath the lower plate 36 is a double conveyer 52 (movable into the plane of the paper as viewed in the drawing) driven by suitable intermittently operative motive means 53.

The motive means 53, the slide actuating means 47, the piston lifting means 33 and the two piston actuating means 50 and 51 are interconnected to operate in a timed sequence as described below by suitable linking means indicated by broken lines in Figure 6.

Assuming the operation is started with the slide 42 carrying the measuring means 45 and 46 is moved to its right hand position, the operation begins at this point by a downward driving stroke of the piston 49 under the influence of actuating means 51 to force the piston through the opening 39 into the measuring space 46 to expel the measured quantity of cheese curd therein through the opening 40 into the container $C_1$ on the conveyer 52. The freely falling piston 30 is meantime dropping by its own weight through the mass of cheese curd into the hopper 28 and into the feed cylinder 29 to force the curd down into the measuring space 45 through the opening 41 until a static condition is reached in which the curd is compressed to the desired degree to fill the voids and to establish uniform curd density. In this connection, it should be observed that similarly to the arrangement of Figures 1–5, the freely falling piston exerts a constant pressure downwardly while undergoing downward motion at a random variable rate which is a function of the characteristics of the particular curd charge being acted upon. Also, air venting to prevent pneumatic blocking of the piston 30 in the cylinder 29, is provided.

Referring to Figure 7, a full charge of curd has been forced into the measuring space 45 and the piston 49 has been lifted from the empty measuring space 46. At this time, referring to Figure 8, the slide 42 is moved to the left to carry the empty measuring space 46 into register with the opening 41 and the feed cylinder 29 and carrying the filled measuring space 45 into register with the empty container $C_2$, the openings 37 and 38 and the piston 48. Meantime the piston 30 is raised up into the hopper and suitable vibrating means 54 actuated to cause the cheese curd in the hopper to fall in place beneath the piston.

The piston 48 is then in position to be driven downwardly to expel the charge in the measuring space 45 into the container $C_2$, as best seen in Figure 9, while the freely falling piston 30 forces another measured charge into the measuring space 46. The piston 48 is then raised as indicated in Figure 10 and the slide 43 moved to the right while the piston 30 is again lifted upwardly in the hopper 28. The loading piston 49 is then driven downwardly to expel the previously measured charge in the measuring space 46 into the waiting container $C_3$ and the cycle is repeated.

While the invention has been described above having specific reference to two preferred embodiments thereof, it will be understood that it can take numerous other forms and shapes. The invention should not, therefore, be regarded as limited except as defined in the following claims.

We claim:

1. Apparatus for metering compressible masses of granular material such as cheese curd comprising a hopper to hold a supply of cheese curd terminating in a tubular feed portion, a measuring member formed with at least one cavity having substantially the same cross-sectional size as the tubular portion and communicable therewith to receive cheese curd therefrom, means for pressing the curd into the cavity to establish a substantially uniform curd density therein including a piston disposed coaxially of the tubular portion having a cross-sectional size corresponding generally thereto, means to draw the piston away from the tubular portion to permit curd to enter therein, means to support the piston to partake of travel toward the tubular portion under predetermined controlled compression forces whereby the travel of the piston is controlled by the resistance imposed by the curd in the cavity and in the tubular portion so that the cheese curd is compressed to a predetermined density and a measured quantity of cheese curd occupies the cavity, and means to expel the measured quantity of curd from the cavity.

2. Apparatus as set forth in claim 1 wherein the measuring member is movably mounted with respect to the tubular portion and wherein the means to expel the measured quantity comprises second piston means movable within the cavity.

3. Apparatus as set forth in claim 2 wherein the measuring member is rotatably mounted and the cavity extends through the measuring member perpendicularly to the axis of rotation.

4. Apparatus as set forth in claim 3, wherein the second piston means is freely movable in the cavity.

5. Apparatus as set forth in claim 2, wherein the measuring member is slidably mounted and includes at least two cavities spaced in the direction of sliding movement, each adapted to be brought into register with the tubular portion of the hopper by sliding the measuring member.

6. Apparatus as set forth in claim 5, wherein the second piston means comprises a pair of pistons movable respectively into the two cavities and means to actuate the pair of pistons sequentially to expel the curd from the corresponding cavities.

7. Apparatus as set forth in claim 2, including a vibrator mounted on the hopper to introduce the cheese curd into the tubular portion and into the path of the piston, and control means to raise the piston, expel the measured quantity of curd from the cavity and vibrate the hopper in predetermined time relationship.

8. Apparatus as set forth in claim 2 including damping means to control the downward motion of the piston before it engages the curd in the hopper.

References Cited in the file of this patent

UNITED STATES PATENTS

| | | |
|---|---|---|
| 1,763,487 | Taylor | June 10, 1930 |
| 2,560,480 | Rogers et al. | July 10, 1951 |

FOREIGN PATENTS

| | | |
|---|---|---|
| 615,259 | Great Britain | Jan. 4, 1949 |